March 21, 1933.   C. E. HATHORN   1,902,071
STABILIZER ADJUSTING MECHANISM
Filed May 31, 1930
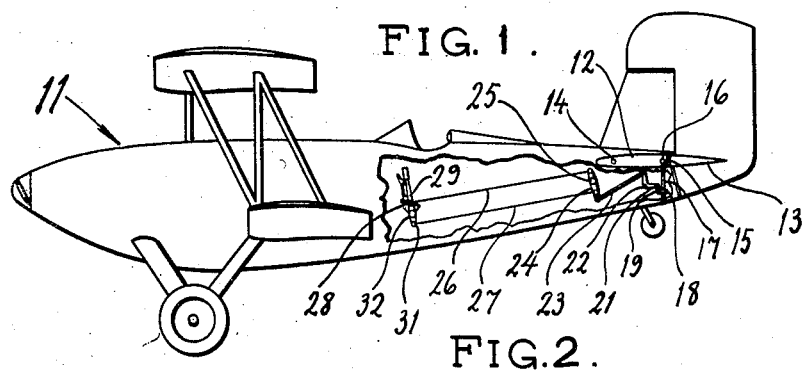
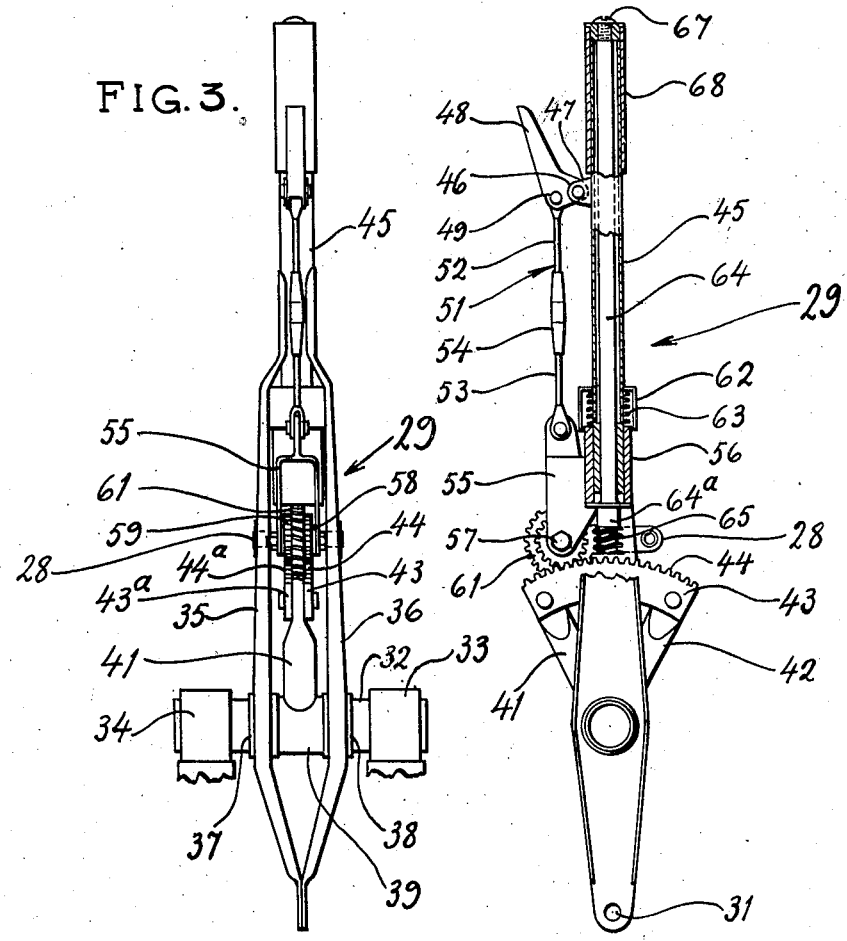
INVENTOR
CHARLES E. HATHORN
BY
ATTORNEY Patented Mar. 21, 1933

1,902,071

UNITED STATES PATENT OFFICE

CHARLES E. HATHORN, OF HEMPSTEAD, NEW YORK, ASSIGNOR TO CURTISS AEROPLANE & MOTOR COMPANY, A CORPORATION OF NEW YORK

STABILIZER ADJUSTING MECHANISM

Application filed May 31, 1930. Serial No. 458,035.

My invention relates to improvements in levers. As shown and described, it is especially adapted for use in adjusting a horizontal stabilizer of an airplane, but it is clear that my improved mechanism is also adapted for many other uses.

Prior to my invention different methods have been used to adjust the positions of horizontal stabilizers of aerial vehicles. In some instances, hand wheels have been provided to adjust the position thereof, while in other aerial vehicles, ordinary levers have been provided for the same purpose. Such use of the ordinary lever is open to the objection that it is impossible thereby to obtain fine adjustments of the stabilizer. The use of the customary hand wheel mechanism is objectionable because in the operation thereof, a large number of turns of the wheel are required to cause any appreciable change in the stabilizer setting. Perhaps, because of the large number of turns required, pilots usually prefer even an ordinary lever rather than a wheel for the purpose of adjusting the stabilizer, in spite of the impossibility of fine adjustment thereby.

One of the objects of this invention is to provide a lever mechanism capable of relatively fine adjustments as well as relatively large adjustments.

A further object of the invention is to provide a stabilizer operating mechanism for aircraft in which a lever is utilized as the operating member, but which is, nevertheless, capable of fine adjustment of the stabilizer.

A further object of the invention is to provide a device of the character described which is light in weight, simple in construction and inexpensive to produce.

Further objects will be apparent from a reading of the subjoined specification and claims and from a consideration of the drawing.

In order to explain the invention more clearly, one embodiment thereof is shown in the accompanying drawing, in which:

Fig. 1 is an elevation of an airplane equipped with my invention having parts thereof broken away to show more clearly the stabilizer adjusting mechanism;

Fig. 2 is a partially sectional view of my improved lever looking in the same direction as Fig. 1, but on a greatly enlarged scale; and Fig. 3 is a similar view of the lever shown in Fig. 2 taken at right angles to Fig. 2.

Referring in detail to the drawing in which like reference characters are used to designate the same or similar parts, there is shown an airplane generally designated 11 equipped with the usual control surfaces including a horizontal stabilizer 12 and an elevator 13. As shown in Fig. 1 the stabilizer is pivotally mounted adjacent to its leading edge at 14, on the frame work of the airplane and the elevator 13 is pivotally mounted on the stabilizer adjacent to the rear edge 15 of the latter. The horizontal stabilizer is adjusted by mechanism connected to the trailing edge of the stabilizer and the elevator is operated by mechanism carried on the horizontal stabilizer. It is clear, however, that if desired, the horizontal stabilizer might be pivoted adjacent to its rear edge and adjusted by mechanism attached adjacent to its leading edge, and the elevator might be operated by mechanism carried directly on the fuselage. The specific details of the stabilizer mounting and elevator operation are substantially immaterial as far as my invention is concerned.

Part of the apparatus provided for adjusting the angle of incidence of the horizontal stabilizer is substantially conventional. Secured at 16 to a point adjacent to the rear edge of the stabilizer is a rod 17. Fixedly secured at the lower end of the rod 17 is a link 18 which is pivotally connected at its opposite end to a second link 19. The link 19 is in turn connected to a bell crank lever 21 pivotally mounted on the framework of the airplane at 22. The bell crank lever 21 is fastened at its upper end to a link 23 which is secured to the lower end of a lever 24 pivoted at 25. Secured to the upper end of the lever 24 is a cable 26 and secured adjacent the lower end thereof is a cable 27. The forward end of the cable 26 is fastened to an eye 28 formed on my improved stabilizer adjusting lever 29, and the forward end of the cable 27 is secured in an eye 31 formed at the lower end of said lever 29. My improved lever 29 is pivoted intermediate the eyes 28 and 31 on a laterally extending rod 32. As shown more clearly in Fig. 3 the rod 32 is carried in supports 33 and 34 secured to part of the frame work of the airplane.

I provide means for holding the lever 29 releasably in any desired position. The rod 32 is secured to the lugs 33 and 34 so as to prevent any movement of the rod relative to the fuselage of the airplane. The lever 29 includes a pair of arms 35 and 36 which form a yoke as shown clearly in Fig. 3. The arm 35 carries a collar 37 and the arm 36 carries a collar 38 by means of which the lever 29 is rotatably mounted upon the rod 32. Interposed between the arms 35 and 36 of the yoke and fixedly secured to the rod 32 is a collar 39 having formed integral therewith a pair of arms or brackets 41 and 42. Fastened to the upper end of the arms 41 and 42 (as by bolts) are a pair of sector gears 43 and 43ª having gear teeth 44 and 44ª. The arms 35 and 36 join each other at a point well above the sector gear and substantially midway of the lever 29 and merge into a sleeve 45 which forms the upper part of the lever. Pivotally mounted at 46 on a lug 47 on the sleeve 45 is a hand grip 48. Secured to an offset portion 49 of the hand grip 48 is a link generally designated 51 which may be formed in two sections 52 and 53 connected by a turn buckle 54. The lower end of the link 51 is secured to a fitting 55. The fitting 55 includes a sleeve 56 which telescopes over the sleeve 45. The fitting 55 also carries at its lower end rotatably mounted upon a bolt 57 a combination worm and spur gear. This combination gear includes a pair of spur gears 58 and 59 meshing with the teeth 44 and 44ª of the sector gears 43 and 43ª. Interposed between the two spur gears and secured against rotation relative thereto is a worm gear 61 provided for purposes later to be described. Formed with the sleeve 45 is a housing 62 enclosing a coil spring 63 which bears at its lower end upon the sleeve 56 and thus urges the fitting 55 and the gears 58 and 59 downward and into mesh with the teeth 44 and 44ª of the sector gears 43 and 43ª. By pressure upon the hand grip 48 the gears may be raised and moved out of mesh with the sectors, whereupon the handle 29 may be rotated about the rod 32 to move the horizontal stabilizer. However, when the pressure on the hand grip 48 is released the spur gears mesh with the sector gears and hold the lever releasably in the desired position.

This movement of the lever 29 is capable of quickly making relatively large changes in the angle of the horizontal stabilizer, but due to the fact that the teeth of the sectors and of the spur gears are necessarily fairly large, it is impossible thereby without further refinements to obtain relatively fine adjustments of the stabilizer. In order to obtain fine adjustments I have provided additional mechanism. Carried within the sleeve 45 is a rod 64 journaled in a bearing 64ª secured to the lower end of the sleeve 56. The rod 64 has formed on its lower end a worm 65 which meshes with the worm gear 61. Thus, rotation of the rod 64 is capable of turning the worm wheel 61 and the gears 58 and 59. Due to the relatively large gear ratio between the worm and the worm gear, relatively large turning movements of the rod 64 produce relatively small movement of the gears 58 and 59 and consequently of the lever 29. Secured to the upper end of the rod 64 by means of a screw 67, is a knurled cap 68 which surrounds the upper part of the sleeve 45. By means of this cap 68, the rod 64 may be rotated any desired amount and through the irreversible drive of the worm and worm gear, the gear wheels 58 and 59 will be turned, thus causing their travel relative to the sectors 43 and 43ª and a consequent movement of the lever 29 also relative thereto.

It is thought that the operation of my improved lever will be apparent from the above description of the mechanism. When the pilot of an airplane desires to change the stabilizer setting of an airplane equipped with my improved lever, he grasps the cap 68 and the grip 48 and pressing upon the grip raises the fitting 55 and thus raises the spur gears 58 and 59 out of mesh with the sector gears 43 and 43ª. Thereafter, he moves the lever 29 about its pivot on the rod 32, thus pulling on one of the cables 26 or 27 and rotating the lever 24 about its pivot. This movement of the lever 24 through the links and levers connected therewith moves the stabilizer 12 about its pivot 14 and effects a rough setting of the stabilizer approximating that which the pilot desires. If a finer adjustment is desired, the pilot rotates the cap 68, and thus through the worm 65 and the worm gear 61 rotates the spur gears 58 and 59. This rotation moves the lever 29 very slowly relative to the sectors 43 and 43ª. This slow movement of the lever 29 relative to the sectors in a similar manner to the large movement thereof turns the lever 24 and moves the horizontal stabilizer slowly to the exact position desired.

It is to be understood that the above described embodiment of the invention is for the purpose of illustration only and various changes may be made therein without departing from the spirit and scope of the invention.

I claim as my invention:

1. In combination, a lever, a fixed gear member positioned adjacent to said lever, a movable gear secured to said lever and adapted to mesh with said fixed gear, a worm wheel secured to the movable gear, and a worm maintained constantly in mesh with the worm wheel regardless of whether the movable gear is in mesh with the fixed gear member or not.

2. In combination, a lever, a fixed gear member positioned adjacent to said lever, a movable gear secured to said lever and adapted to be moved into mesh with said fixed gear member, means for moving the movable gear into and out of engagement with the fixed gear member, a worm wheel secured to the movable gear, a worm maintained constantly in mesh with the worm wheel regardless of whether the movable gear is in mesh with the fixed gear member or not, and means for rotating the worm.

3. In combination; a lever; a fixed gear member positioned adjacent to said lever; a movable gear secured to said lever and adapted to mesh with said fixed gear member; and means for rotating the movable gear regardless of whether it is in mesh with the fixed gear member or not, said last named means comprising a worm wheel secured to said movable gear, and a worm gear maintained constantly in mesh with said worm wheel.

4. In combination, a lever; a fixed gear member adjacent to said lever; a movable gear secured to said lever and adapted to mesh with said fixed gear member; and means for rotating the movable gear, said last named means comprising a worm wheel secured to said movable gear, a worm gear maintained constantly in mesh with said worm wheel, a knurled cap positioned over the upper end of said lever, and means connecting said cap to said worm for turning said worm.

5. In combination; a lever; a fixed gear member positioned adjacent to said lever; a movable gear secured to said lever and adapted to mesh with said fixed gear member; resilient means for moving said movable gear into mesh with said fixed gear member; manually controllable means for moving said movable gear out of mesh with said fixed gear member; and means for rotating the movable gear regardless of whether it is in mesh with the fixed gear member or not, said last named means comprising a worm wheel secured to said movable gear, and a worm gear maintained constantly in mesh with said worm wheel.

6. In combination, a lever; a fixed gear member positioned adjacent to said lever; a movable gear secured to said lever and adapted to mesh with said fixed gear member; resilient means for moving said movable gear into mesh with said fixed gear member; manually controllable means for moving said movable gear out of mesh with said fixed gear member; and means for rotating the movable gear regardless of whether it is in mesh with the fixed gear member or not, said last named means comprising a worm wheel secured to said movable gear, a worm gear maintained constantly in mesh with said worm wheel, a knurled cap positioned over the upper end of said lever and means connecting said cap to said worm for turning said worm.

7. In an airplane in combination, a horizontal stabilizer for said airplane, a lever pivoted on said airplane, means connecting said lever to said stabilizer, a fixed gear member positioned adjacent to said lever, a movable gear secured to said lever and adapted to mesh with said fixed gear, a worm wheel secured to the movable gear, and a worm maintained constantly in mesh with the worm wheel regardless of whether the movable gear is in mesh with the fixed gear member or not.

In testimony whereof I hereunto affix my signature.

CHARLES E. HATHORN.